(12) United States Patent
Koetting et al.

(10) Patent No.: US 8,663,829 B2
(45) Date of Patent: Mar. 4, 2014

(54) BATTERY SYSTEMS, BATTERY MODULES, AND METHOD FOR COOLING A BATTERY MODULE

(75) Inventors: William Koetting, Davisburg, MI (US); Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 886 days.

(21) Appl. No.: 12/433,534

(22) Filed: Apr. 30, 2009

(65) Prior Publication Data

US 2010/0279154 A1    Nov. 4, 2010

(51) Int. Cl.
*H01M 10/50* (2006.01)
(52) U.S. Cl.
CPC ...... *H01M 10/5004* (2013.01); *H01M 10/5002* (2013.01); *H01M 10/50* (2013.01)
USPC ........................................................ 429/120
(58) Field of Classification Search
CPC .............. H01M 6/5038; H01M 10/50; H01M 10/5002; H01M 10/5004; H01M 10/5006; H01M 10/5008; H01M 10/5044
USPC ........................................................ 429/120
See application file for complete search history.

(56) References Cited

U.S. PATENT DOCUMENTS

| | | |
|---|---|---|
| 2,273,244 A | 2/1942 | Ambruster |
| 2,391,859 A | 1/1946 | Earl |
| 3,503,558 A | 3/1970 | Galiulo et al. |
| 3,522,100 A | 7/1970 | Lindstrom |
| 3,550,681 A | 12/1970 | Stier et al. |
| 3,866,704 A | 2/1975 | Bowers et al. |
| 3,964,930 A | 6/1976 | Reiser |
| 4,063,590 A | 12/1977 | Mcconnell |
| 4,298,904 A | 11/1981 | Koenig |
| 4,322,776 A | 3/1982 | Job et al. |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

JP 2009-009889 A English Machine Translation.*

(Continued)

*Primary Examiner* — Ula C Ruddock
*Assistant Examiner* — Scott J Chmielecki
(74) *Attorney, Agent, or Firm* — Buckert Patent & Trademark Law, P.C.; John F. Buckert

(57) ABSTRACT

Battery systems, battery modules, and a method for cooling a battery module are provided. The battery module includes a first battery cell, and a first cooling fin having a first panel portion and first and second rail portions that are disposed on first and second ends, respectively, of the first panel portion. The first battery cell is disposed adjacent to a first side of the first panel portion. The first and second rail portions have a thickness greater than the first panel portion. The first cooling fin conducts heat energy from the first battery cell into the first cooling fin to cool the first battery cell. The battery module further includes first and second conduits extending through the first and second rail portions, respectively, that receive a fluid that flows through the first and second conduits to conduct heat energy from the first cooling fin into the fluid.

17 Claims, 11 Drawing Sheets

(56) References Cited

U.S. PATENT DOCUMENTS

| | | | |
|---|---|---|---|
| 4,390,841 A | 6/1983 | Martin et al. | |
| 4,396,689 A | 8/1983 | Grimes et al. | |
| 4,518,663 A | 5/1985 | Kodali et al. | |
| 4,646,202 A | 2/1987 | Hook et al. | |
| 4,701,829 A | 10/1987 | Bricaud et al. | |
| 4,777,561 A | 10/1988 | Murphy et al. | |
| 4,849,858 A | 7/1989 | Grapes et al. | |
| 4,936,409 A | 6/1990 | Nix et al. | |
| 4,995,240 A * | 2/1991 | Barthel et al. | 62/225 |
| 5,057,968 A | 10/1991 | Morrison | |
| 5,071,652 A | 12/1991 | Jones et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,354,630 A | 10/1994 | Earl et al. | |
| 5,356,735 A | 10/1994 | Meadows et al. | |
| 5,364,711 A | 11/1994 | Yamada et al. | |
| 5,378,555 A | 1/1995 | Waters et al. | |
| 5,385,793 A | 1/1995 | Tiedemann et al. | |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,558,949 A | 9/1996 | Iwatsuki et al. | |
| 5,561,005 A | 10/1996 | Omaru et al. | |
| 5,589,290 A | 12/1996 | Klink et al. | |
| 5,606,242 A | 2/1997 | Hull et al. | |
| 5,652,502 A | 7/1997 | Van Phuoc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,736,836 A | 4/1998 | Hasegawa et al. | |
| 5,756,227 A | 5/1998 | Suzuki et al. | |
| 5,796,239 A | 8/1998 | Van Phuoc et al. | |
| 5,825,155 A | 10/1998 | Ito et al. | |
| 5,937,664 A | 8/1999 | Matsuno et al. | |
| 5,982,403 A | 11/1999 | Inagaki | |
| 6,016,047 A | 1/2000 | Notten et al. | |
| 6,087,036 A | 7/2000 | Rouillard et al. | |
| 6,099,986 A | 8/2000 | Gauthier et al. | |
| 6,111,387 A | 8/2000 | Kouzu et al. | |
| 6,117,584 A | 9/2000 | Hoffman et al. | |
| 6,121,752 A | 9/2000 | Kitihara et al. | |
| 6,176,095 B1 | 1/2001 | Porter | |
| 6,230,834 B1 | 5/2001 | Van Hout et al. | |
| 6,257,328 B1 | 7/2001 | Fujiwara et al. | |
| 6,344,728 B1 | 2/2002 | Kouzu et al. | |
| 6,353,815 B1 | 3/2002 | Vilim et al. | |
| 6,362,598 B2 | 3/2002 | Laig-Horstebrock et al. | |
| 6,399,238 B1 | 6/2002 | Oweis et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,512,347 B1 * | 1/2003 | Hellmann et al. | 320/107 |
| 6,515,454 B2 | 2/2003 | Schoch | |
| 6,534,954 B1 | 3/2003 | Plett | |
| 6,563,318 B2 | 5/2003 | Kawakami et al. | |
| 6,569,556 B2 | 5/2003 | Zhou et al. | |
| 6,648,090 B2 | 11/2003 | Iwase | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,709,783 B2 | 3/2004 | Ogata et al. | |
| 6,724,172 B2 | 4/2004 | Koo | |
| 6,750,630 B2 | 6/2004 | Inoue et al. | |
| 6,771,502 B2 | 8/2004 | Getz, Jr. et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 * | 12/2004 | Bhatti et al. | 73/40.5 R |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,878,485 B2 | 4/2005 | Ovshinsky et al. | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,070,874 B2 | 7/2006 | Blanchet et al. | |
| 7,072,871 B1 | 7/2006 | Tinnemeyer | |
| 7,074,517 B2 | 7/2006 | Higashino | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,143,124 B2 | 11/2006 | Garthwaite | |
| 7,147,045 B2 | 12/2006 | Quisenberry et al. | |
| 7,150,935 B2 | 12/2006 | Hamada et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,278,389 B2 | 10/2007 | Kirakosyan | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,467,525 B1 | 12/2008 | Ohta et al. | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,531,270 B2 | 5/2009 | Buck et al. | |
| 7,540,102 B2 | 6/2009 | Olmr et al. | |
| 7,583,059 B2 | 9/2009 | Cho | |
| 7,589,532 B2 | 9/2009 | Plett | |
| 7,656,122 B2 | 2/2010 | Plett | |
| 7,723,957 B2 | 5/2010 | Plett | |
| 7,794,868 B2 | 9/2010 | Yang | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,829,216 B2 | 11/2010 | Han et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 2001/0035739 A1 | 11/2001 | Laig-Horstebrock et al. | |
| 2002/0130637 A1 | 9/2002 | Schoch | |
| 2002/0169581 A1 | 11/2002 | Sarfert | |
| 2002/0182493 A1 | 12/2002 | Ovshinsky et al. | |
| 2003/0052690 A1 | 3/2003 | Schoch | |
| 2003/0082440 A1 | 5/2003 | Mrotek et al. | |
| 2003/0184307 A1 | 10/2003 | Kozlowski et al. | |
| 2003/0211384 A1 | 11/2003 | Hamada et al. | |
| 2004/0000892 A1 | 1/2004 | Jae-Seung | |
| 2004/0021442 A1 | 2/2004 | Higashino | |
| 2004/0032264 A1 | 2/2004 | Schoch | |
| 2004/0189257 A1 | 9/2004 | Dougherty et al. | |
| 2005/0001627 A1 | 1/2005 | Anbuky et al. | |
| 2005/0026014 A1 | 2/2005 | Fogaing et al. | |
| 2005/0035742 A1 | 2/2005 | Koo et al. | |
| 2005/0046388 A1 | 3/2005 | Tate, Jr. et al. | |
| 2005/0089750 A1 | 4/2005 | Ng et al. | |

(56) References Cited

U.S. PATENT DOCUMENTS

| | | |
|---|---|---|
| 2005/0100786 A1 | 5/2005 | Ryu et al. |
| 2005/0103486 A1 | 5/2005 | Demuth et al. |
| 2005/0110460 A1 | 5/2005 | Arai et al. |
| 2005/0127874 A1 | 6/2005 | Lim et al. |
| 2005/0134038 A1 | 6/2005 | Walsh |
| 2005/0194936 A1 | 9/2005 | Cho |
| 2006/0097698 A1 | 5/2006 | Plett |
| 2006/0100833 A1 | 5/2006 | Plett |
| 2006/0111854 A1 | 5/2006 | Plett |
| 2006/0111870 A1 | 5/2006 | Plett |
| 2006/0234119 A1 | 10/2006 | Kruger et al. |
| 2006/0286450 A1 | 12/2006 | Yoon et al. |
| 2007/0035307 A1 | 2/2007 | Schoch |
| 2007/0046292 A1 | 3/2007 | Plett |
| 2007/0072066 A1 | 3/2007 | Yoon et al. |
| 2007/0087266 A1 | 4/2007 | Bourke et al. |
| 2007/0103120 A1 | 5/2007 | Plett |
| 2007/0120533 A1 | 5/2007 | Plett |
| 2007/0188143 A1 | 8/2007 | Plett |
| 2007/0236182 A1 | 10/2007 | Plett |
| 2008/0003491 A1 | 1/2008 | Yahnker et al. |
| 2008/0041079 A1 | 2/2008 | Nishijima et al. |
| 2008/0094035 A1 | 4/2008 | Plett |
| 2008/0182151 A1 | 7/2008 | Mizusaki et al. |
| 2008/0248338 A1 | 10/2008 | Yano et al. |
| 2009/0029239 A1 | 1/2009 | Koetting et al. |
| 2009/0087727 A1 | 4/2009 | Harada et al. |
| 2009/0104512 A1 | 4/2009 | Fassnacht et al. |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325053 A1 | 12/2009 | Koetting et al. |
| 2009/0325054 A1 | 12/2009 | Payne et al. |
| 2009/0325055 A1 | 12/2009 | Koetting et al. |
| 2010/0086842 A1 | 4/2010 | Yang |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0266883 A1 | 10/2010 | Koetting et al. |
| 2010/0275619 A1 | 11/2010 | Koetting et al. |
| 2010/0276132 A1 | 11/2010 | Payne |
| 2010/0279152 A1 | 11/2010 | Payne |
| 2010/0279153 A1 | 11/2010 | Payne |
| 2010/0279154 A1 | 11/2010 | Koetting et al. |
| 2011/0027625 A1 | 2/2011 | Payne |
| 2011/0027640 A1 | 2/2011 | Gadawski et al. |
| 2011/0041525 A1 | 2/2011 | Kim et al. |
| 2011/0052959 A1 | 3/2011 | Koetting et al. |
| 2012/0082880 A1 | 4/2012 | Koetting et al. |

FOREIGN PATENT DOCUMENTS

| | | | |
|---|---|---|---|
| EP | 0673553 B1 | | 2/2001 |
| EP | 1091432 A2 | | 4/2001 |
| EP | 1435675 A1 | | 7/2004 |
| EP | 1577966 A | | 9/2005 |
| EP | 1852925 A | | 11/2007 |
| JP | 58084882 A | | 5/1983 |
| JP | 4056079 A | | 2/1992 |
| JP | 08111244 | | 4/1996 |
| JP | 8138735 A | | 5/1996 |
| JP | 8222280 A | | 8/1996 |
| JP | 09129213 | | 5/1997 |
| JP | 9129213 A | | 5/1997 |
| JP | 09219213 | | 8/1997 |
| JP | 10199510 A | | 7/1998 |
| JP | 11066949 A | | 3/1999 |
| JP | 11191432 A | | 7/1999 |
| JP | 2001105843 A | | 4/2001 |
| JP | 2002038033 A | | 2/2002 |
| JP | 2002319383 A | | 10/2002 |
| JP | 2003188323 A | | 7/2003 |
| JP | 2003219572 A | | 7/2003 |
| JP | 2003257505 A | | 9/2003 |
| JP | 2005126315 | | 5/2005 |
| JP | 2005349955 A | | 12/2005 |
| JP | 2006139928 A | | 6/2006 |
| JP | 2007305425 A | | 11/2007 |
| JP | 2008054379 A | | 3/2008 |
| JP | 2008062875 A | | 3/2008 |
| JP | 2008080995 | | 4/2008 |
| JP | 2008159440 A | | 7/2008 |
| JP | 2009009889 A | * | 1/2009 |
| JP | 2009054297 A | | 3/2009 |
| KR | 100256750 B1 | | 5/2000 |
| KR | 100503853 B1 | | 7/2005 |
| KR | 1020050092605 A | | 9/2005 |
| KR | 1020070050468 A | | 5/2007 |
| KR | 100765659 B1 | | 10/2007 |
| KR | 100889241 B1 | | 4/2008 |
| KR | 20080047641 A | | 5/2008 |
| KR | 100904375 B1 | | 6/2009 |
| KR | 20090082212 A | | 7/2009 |
| KR | 100921346 B1 | | 10/2009 |
| WO | WO94/02969 A1 | | 2/1994 |
| WO | WO03/071616 A2 | | 8/2003 |
| WO | WO2004/023595 A1 | | 3/2004 |
| WO | 2006101343 A | | 9/2006 |
| WO | 2007007503 A | | 1/2007 |
| WO | 2007115743 A2 | | 10/2007 |
| WO | 2009073225 A | | 6/2009 |

OTHER PUBLICATIONS

JP 2009009889 A English machine translation.*
Chinese Office Action dated Dec. 7, 2007 for Chinese Patent Application No. 200480025941.5 (PCT/KR2004/002399).
European Supplementary Search Report dated Aug. 28, 2009 for EP Application No. 04774658.
International Search Report for International application No. PCT/KR2005/003755 dated Mar. 2, 2006.
International Search Report for International application No. PCT/KR2009/000258 dated Aug. 28, 2009.
International Search Report for International application No. PCT/KR2009/003432 dated Jan. 18, 2010.
International Search Report for International application No. PCT/KR2009/003434 dated Jan. 18, 2010.
International Search Report for International application No. PCT/KR2010/002336 dated Jan. 31, 2011.
International Search Report for International application No. PCT/KR2010/002337 dated Jan. 31, 2011.
International Search Report for International application No. PCT/KR2010/002338 dated Jan. 31, 2011.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.
U.S. Appl. No. 13/073,000, filed Mar. 28, 2011 entitled Battery Disconnect Unit and Method of Assembling the Battery Disconnect Unit.
U.S. Appl. No. 13/076,774, filed Mar. 31, 2011 entitled Battery Pack Having Liquid Leak Detection System.

(56) References Cited

OTHER PUBLICATIONS

U.S. Appl. No. 12/165,100, filed Jun. 30, 2008 entitled Battery Cell Assembly Having Heat Exchanger with Serpentine Flow Path.
U.S. Appl. No. 12/164,780, filed Jun. 30, 2008 entitled Battery Module Having Battery Cell Assembly with Heat Exchanger.
U.S. Appl. No. 12/164,627, filed Jun. 30, 2008 entitled Liquid Cooled Battery Manifold Assembly with Flow Balancing Feature.
U.S. Appl. No. 12/246,073, filed Oct. 6, 2008 entitled Battery Cell Carrier That Engages Side Walls of Active Cell.
U.S. Appl. No. 12/164,445, filed Jun. 30, 2008 entitled Battery Module Having a Rubber Cooling Manifold.
U.S. Appl. No. 12/016,630, filed Jan. 18, 2008 entitled Battery Cell Assembly and Method for Assembling the Battery Cell Assembly.
U.S. Appl. No. 12/258,696, filed Oct. 27, 2008 entitled Battery Module Having Cooling Manifold with Ported Screws and Method for Cooling the Battery Module.
U.S. Appl. No. 12/433,155, filed Apr. 30, 2009 entitled Cooling System for a Battery and a Method for Cooling the Battery System.
U.S. Appl. No. 12/433,427, filed Apr. 30, 2009 entitled Cooling Manifold and Method for Manufacturing the Cooling Manifold.
U.S. Appl. No. 12/433,485, filed Apr. 30, 2009 entitled Battery Systems, Battery Module, and Method for Cooling the Battery Module.
U.S. Appl. No. 12/433,397, filed Apr. 30, 2009 entitled Battery Systems, Battery Modules, and Method for Cooling a Battery Module.
U.S. Appl. No. 12/164,741, filed Jun. 30, 2008 entitled Battery Module Having Battery Cell Assemblies with Alignment-Coupling Features.
U.S. Appl. No. 12/426,795, filed Apr. 20, 2009 entitled Frame Member, Frame Assembly and Battery Cell Assembly Made Therefrom and Methods of Making the Same.
"Gasket". Merriam-Webster. Merriam-Webster. Web. May 30, 2012. <http://www.merriam-webster.com/dictionary/gasket>.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.
Thomas J. Gadawski et al., pending U.S. Appl. No. 13/433,649 entitled "Battery System and Method for Cooling the Battery System," filed with the U.S. Patent and Trademark Office on Mar. 29, 2012.
U.S. Appl. No. 13/475,963, filed on May 19, 2012 entitled Battery Cell Assembly and Method for Manufacturing a Cooling Fin for the Battery Cell Assembly.
U.S. Appl. No. 13/586,960, filed on Aug. 16, 2012 entitled Battery Module.
U.S. Appl. No. 13/587,030, filed on Aug. 16, 2012 entitled Battery Module and Method for Assembling the Battery Module.

\* cited by examiner

BATTERY SYSTEMS, BATTERY MODULES, AND METHOD FOR COOLING A BATTERY MODULE

TECHNICAL FIELD

This application relates to battery systems, battery modules, and a method for cooling the battery module.

BACKGROUND OF THE INVENTION

In a typical air-cooled battery pack, ambient air from ambient atmosphere is directed across battery cells in the battery pack and is subsequently exhausted from the battery pack. However, the typical air-cooled battery pack has a major challenge in maintaining a temperature of the battery pack within a desired temperature range.

In particular, a maximum operating temperature of the battery cells can often be less than a temperature of ambient air utilized to cool the batteries. In this situation, it is impossible to maintain the battery cells within a desired temperature range in an air-cooled battery pack.

Accordingly, the inventors herein have recognized a need for an improved battery system having a battery module and method for cooling the battery module that minimizes and/or eliminates the above-mentioned deficiency.

SUMMARY OF THE INVENTION

A battery module in accordance with an exemplary embodiment is provided. The battery module includes a first battery cell. The battery module further includes a first cooling fin having a first panel portion and first and second rail portions that are disposed on first and second ends, respectively, of the first panel portion. The first battery cell is disposed adjacent to a first side of the first panel portion. The first and second rail portions have a thickness greater than the first panel portion. The first cooling fin conducts heat energy from the first battery cell into the first cooling fin to cool the first battery cell. The battery module further includes first and second conduits extending through the first and second rail portions, respectively, of the first cooling fin that receive a fluid that flows through the first and second conduits to conduct heat energy from the first cooling fin into the fluid.

A battery system in accordance with another exemplary embodiment is provided. The battery system includes a battery module having a first battery cell, a first cooling fin, and first and second conduits. The first cooling fin has a first panel portion and first and second rail portions disposed on first and second ends, respectively, of the first panel portion. The first battery cell is disposed adjacent to a first side of the first panel portion. The first and second rail portions have a thickness greater than the first panel portion. The first cooling fin conducts heat energy from the first battery cell into the first cooling fin to cool the first battery cell. The first and second conduits extend through the first and second rail portions, respectively, of the first cooling fin and receive a refrigerant that flows through the first and second conduits to conduct heat energy from the first cooling fin into the refrigerant. The battery system further includes a condenser fluidly coupled to the first and second conduits of the battery module. The condenser is configured to receive the refrigerant from the first and second conduits of the battery module and to extract heat energy from the refrigerant. The battery system further includes a compressor fluidly coupled to the condenser and configured to receive the refrigerant from the condenser. The compressor is further fluidly coupled to the first and second conduits of the battery module. The compressor is configured to pump the refrigerant from the condenser into the first and second conduits.

A battery system in accordance with another exemplary embodiment is provided. The battery system includes a battery module having a first battery cell, a first cooling fin, and first and second conduits. The first cooling fin has a first panel portion and first and second rail portions disposed on first and second ends, respectively, of the first panel portion. The first battery cell is disposed adjacent to a first side of the first panel portion. The first and second rail portions have a thickness greater than the first panel portion. The first cooling fin conducts heat energy from the first battery cell to the first cooling fin to cool the first battery cell. The first and second conduits extend through the first and second rail portions, respectively, of the first cooling fin and receive a coolant that flows through the first and second conduits to conduct heat energy from the first cooling fin into the coolant. The battery system further includes a heat exchanger fluidly coupled to the battery module. The heat exchanger is configured to receive the coolant from the battery module therein and to extract heat energy from the coolant flowing therethrough. The battery system further includes a cold plate fluidly coupled to the heat exchanger. The cold plate is configured to extract heat energy from the coolant flowing therethrough. The battery system further includes a reservoir fluidly coupled between the cold plate and a pump. The reservoir is configured to receive the coolant from the cold plate and to route the coolant to the pump. The pump is further fluidly coupled to the first and second conduits of the battery module. The pump is configured to pump the coolant from the reservoir into the first and second conduits.

A method for cooling a battery module in accordance with another exemplary embodiment is provided. The battery module has a battery cell, a cooling fin, and first and second conduits. The cooling fin has a panel portion and first and second rail portions disposed on first and second ends, respectively, of the panel portion. The battery cell is disposed adjacent to a first side of the panel portion. The first and second rail portions have a thickness greater than the first panel portion. The method includes conducting heat energy from the battery cell into the panel portion of the cooling fin disposed on the first side of the battery cell to cool the battery cell. The method further includes conducting heat energy from the panel portion into the first and second rail portions of the cooling fin. The method further includes conducting heat energy from the first and second rail portions into the first and second conduits, respectively, extending through the first and second rail portions, respectively, of the cooling fin. The method further includes receiving a fluid in the first and second conduits and conducting heat energy from the first and second conduits into the fluid.

A battery module in accordance with another exemplary embodiment is provided. The battery module includes a cylindrical battery cell. The battery module further includes a cooling fin having a tubular portion and a laminated box-shaped portion coupled to the tubular portion. The tubular portion is configured to surround a portion of the cylindrical battery cell. The cooling fin conducts heat energy from the battery cell to the cooling fin to cool the battery cell. The battery module further includes a conduit extending through the laminated box-shaped portion of the cooling fin that receives a fluid that flows through the conduit to conduct heat energy from the cooling fin into the fluid.

DETAILED DESCRIPTION OF EXEMPLARY EMBODIMENTS

Figure 1:
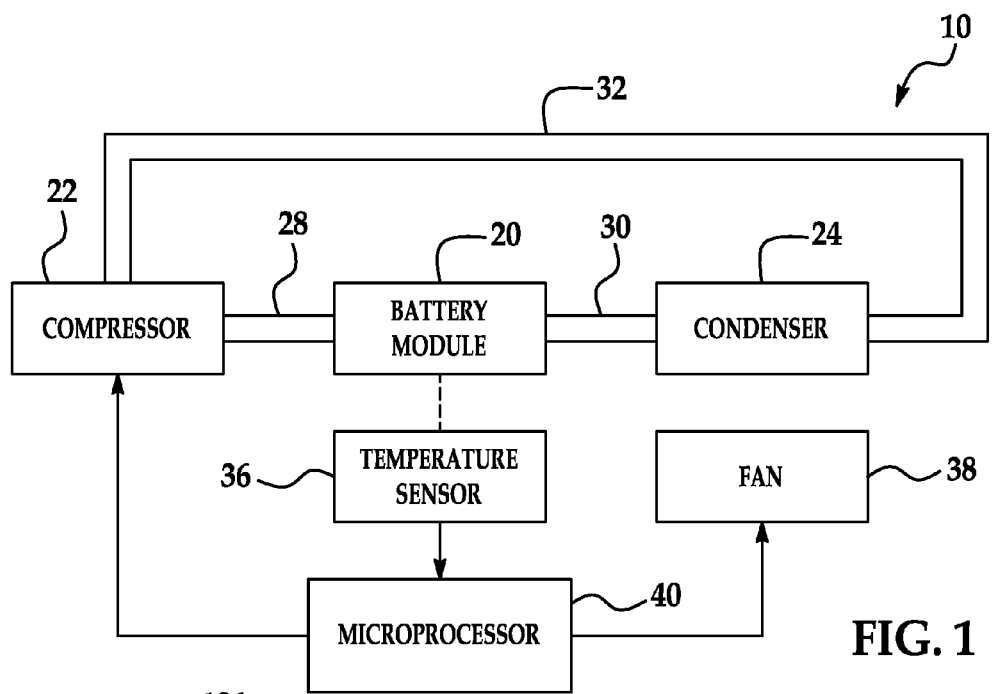
FIG. 1 is a schematic of a battery system in accordance with an exemplary embodiment.

Referring to FIG. 1, a battery system 10 for generating electrical power in accordance with an exemplary embodiment is illustrated. The battery system 10 includes a battery module 20, a compressor 22, a condenser 24, conduits 28, 30, 32, a temperature sensor 36, a fan 38, and a microprocessor 40. An advantage of the battery module 20 is that the battery module 20 utilizes a cooling fin having both a panel portion and rail portions to conduct heat energy from battery cells in the battery module 20 to effectively cool the battery cells.

For purposes of understanding, the term "fluid" means either a liquid or a gas. For example, a fluid can comprise either a coolant or a refrigerant. Exemplary coolants include ethylene glycol and propylene glycol. Exemplary refrigerants include R-11, R-12, R-22, R-134A, R-407C and R-410A.

Figure 2:
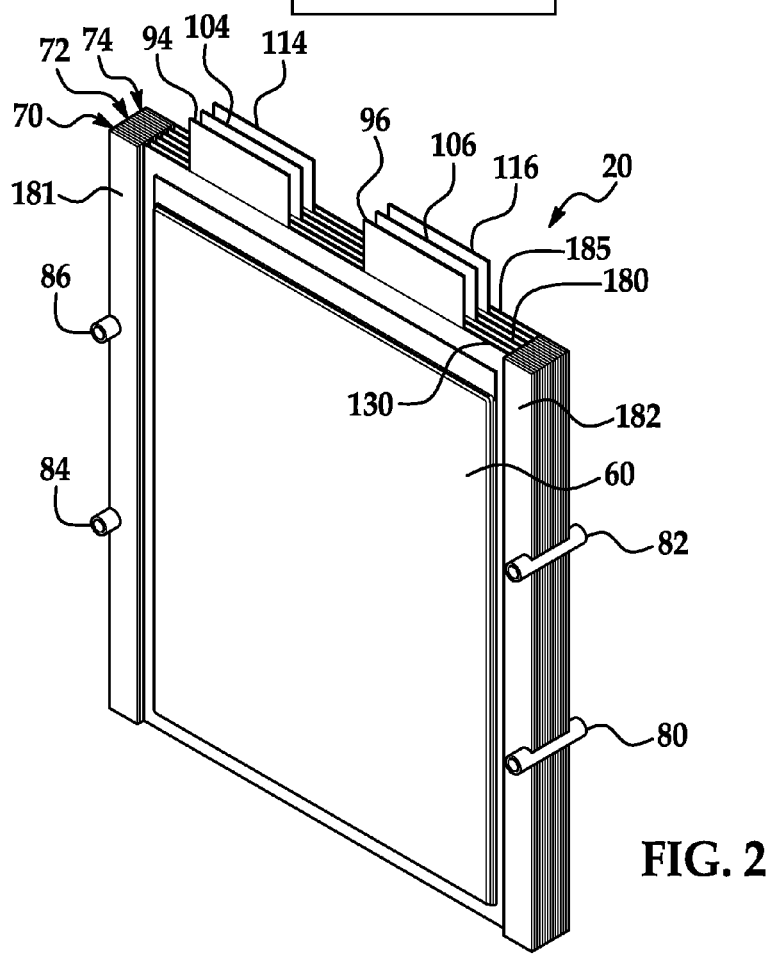
FIG. 2 is a schematic of a battery module utilized in the battery system of FIG. 1 in accordance with another exemplary embodiment.
Figure 3:
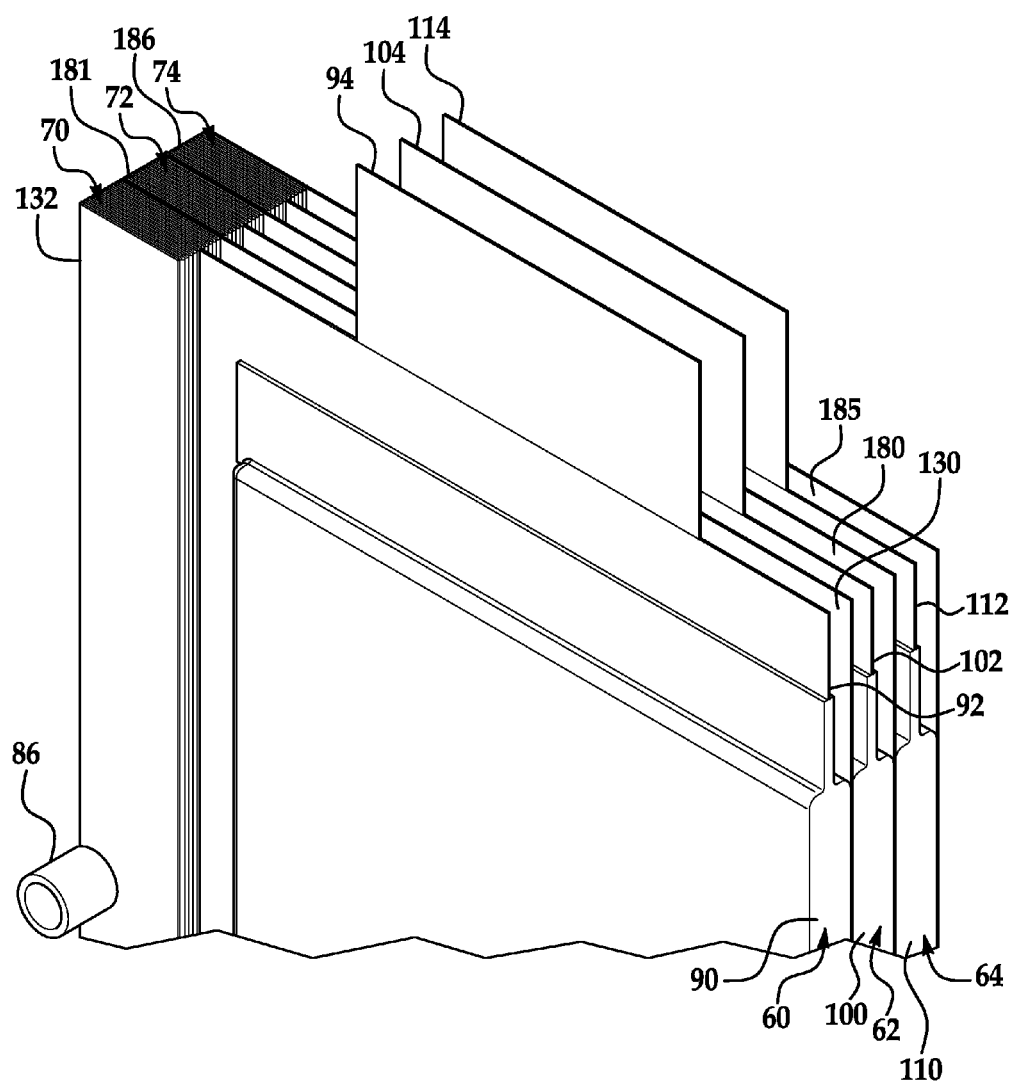
FIG. 3 is a schematic of a top portion of the battery module of FIG. 2.
Figure 4:
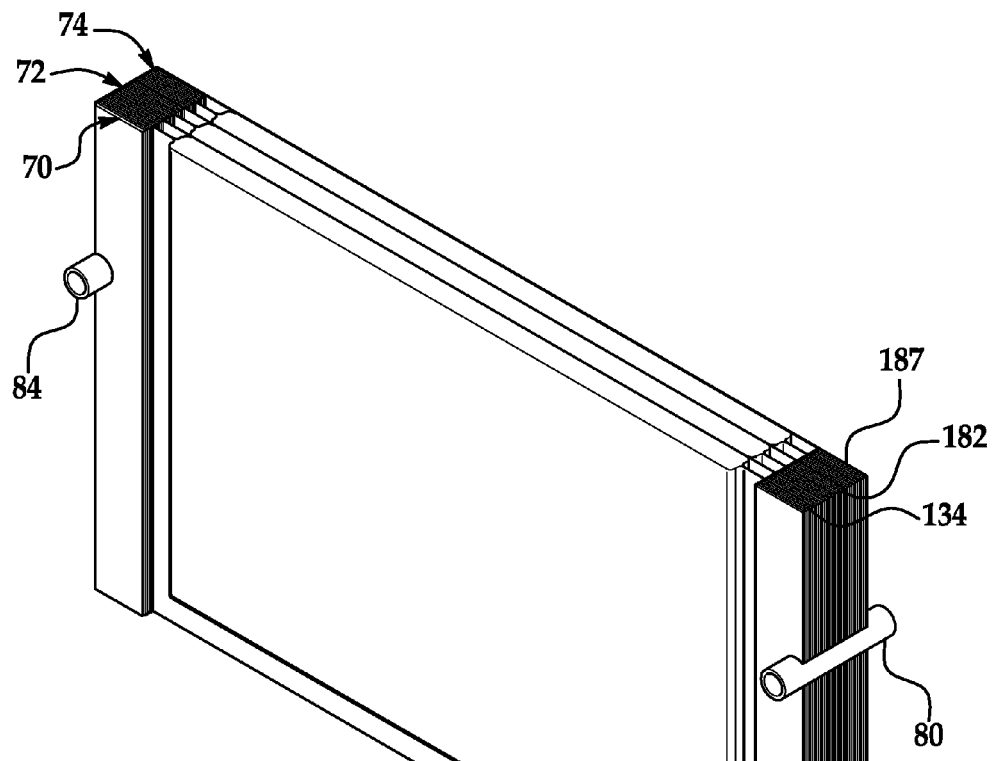
FIG. 4 is a schematic of a bottom portion of the battery module of FIG. 2.
Figure 5:
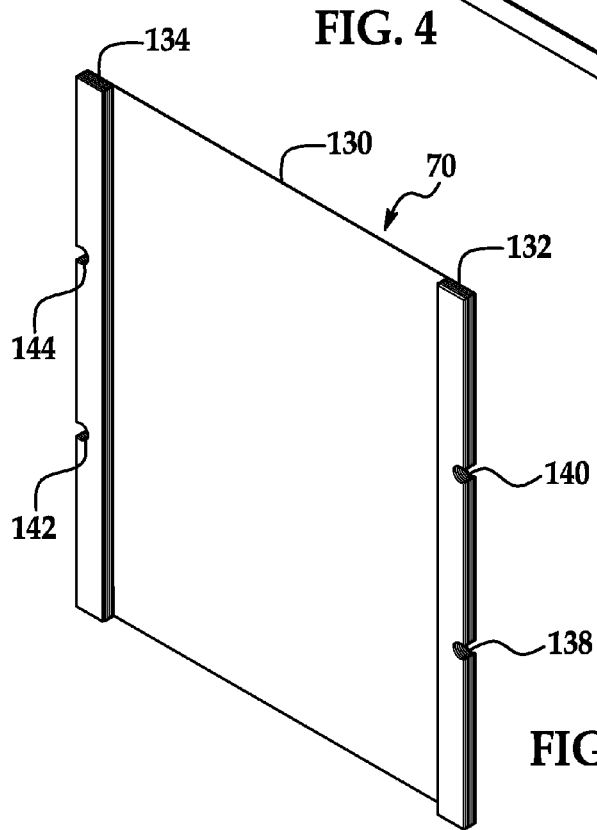
FIG. 5 is a schematic of a cooling fin utilized in the battery module of FIG. 2.
Figure 6:
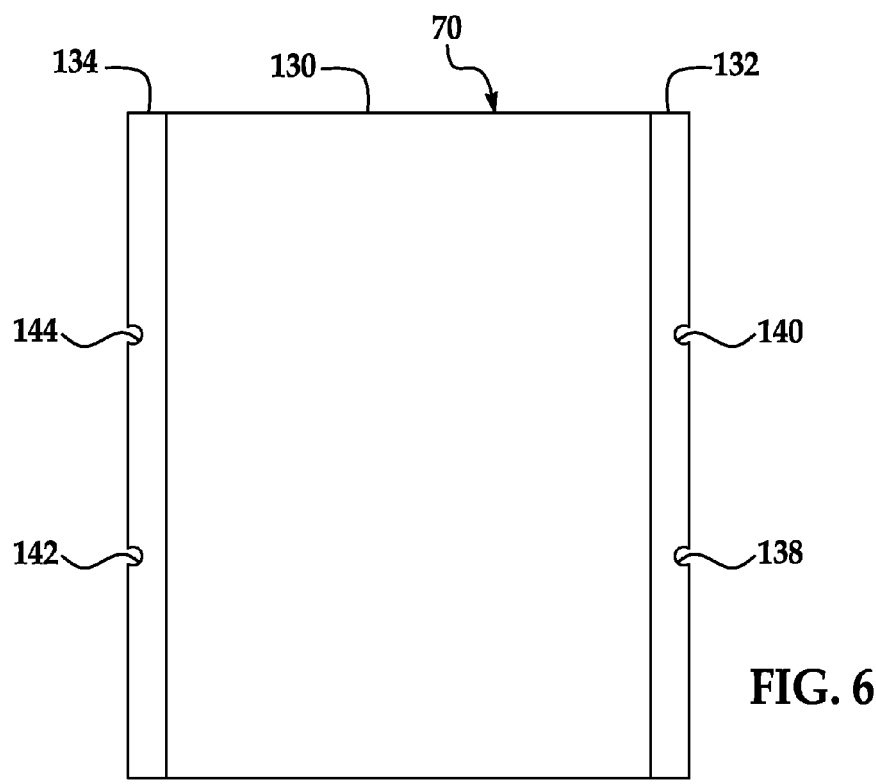
FIG. 6 is a schematic of a first side of the cooling fin of FIG. 5.
Figure 7:
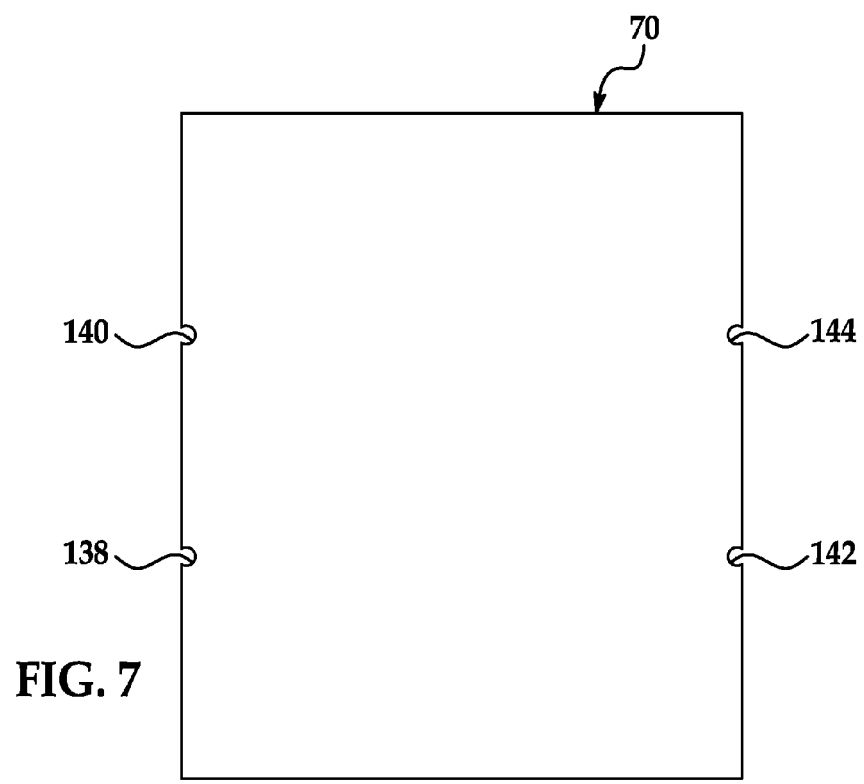
FIG. 7 is a schematic of a second side of the cooling fin of FIG. 5.
Figure 8:
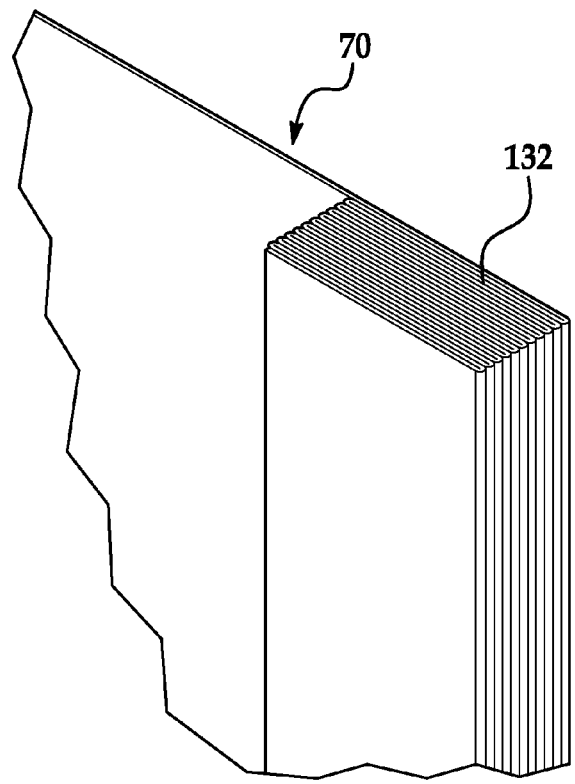
FIG. 8 is an enlarged schematic of a portion of a rail portion utilized in the cooling fin of FIG. 5.
Figure 9:
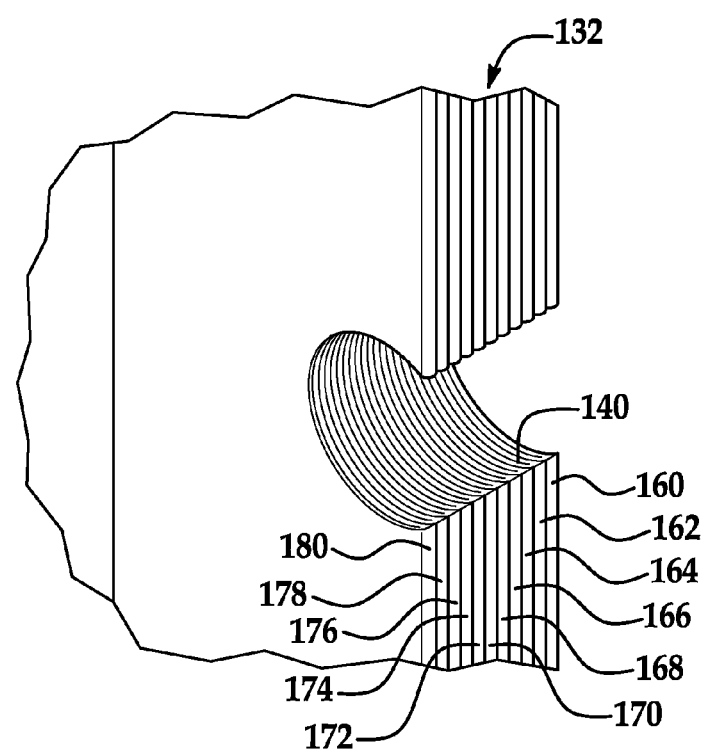
FIG. 9 is another enlarged schematic of a portion of the rail portion utilized in the cooling fin of FIG. 5.

Referring to FIGS. 2-4, the battery module 20 is provided to generate a voltage therein in accordance with another exemplary embodiment. The battery module 20 includes battery cells 60, 62, 64, cooling fins 70, 72, 74 and conduits 80, 82, 84, 86.

The battery cell 60 is provided to generate an operational voltage. The battery cell 60 includes a body portion 90, a peripheral extension portion 92, and electrodes 94, 96. The body portion 90 is generally rectangular-shaped and has the peripheral extension portion 92 extending around the periphery of the body portion 90. In an exemplary embodiment, the electrodes 94, 96 extend from a top portion of the battery cell 60 and have an operational voltage generated therebetween.

The battery cell 62 is provided to generate an operational voltage. The battery cell 62 includes a body portion 100, a peripheral extension portion 102, and electrodes 104, 106.

The body portion 100 is generally rectangular-shaped and has the peripheral extension portion 102 extending around the periphery of the body portion 100. In an exemplary embodiment, the electrodes 104, 106 extend from a top portion of the battery cell 62 and have an operational voltage generated therebetween.

The battery cell 64 is provided to generate an operational voltage. The battery cell 64 includes a body portion 110, a peripheral extension portion 112, and electrodes 114, 116. The body portion 110 is generally rectangular-shaped and has the peripheral extension portion 112 extending around the periphery of the body portion 110. In an exemplary embodiment, the electrodes 114, 116 extend from a top portion of the battery cell 64 and have an operational voltage generated therebetween.

In one exemplary embodiment, each battery cell is a lithium-ion battery cell. In alternative embodiments, the battery cells could be nickel-cadmium battery cells or nickel metal hydride battery cells for example. Of course, other types of battery cells known to those skilled in the art could be utilized.

The cooling fins 70, 72, 74 are provided to conduct heat energy from the battery cells 60, 62, 64 into the cooling fins 70, 72, 74 to cool the battery cells 60, 62, 64. In particular, the cooling fins 70, 72, 74 can maintain the battery cells within a desired temperature range, and in particular can maintain the battery cells at a temperature less than a threshold temperature level. In one exemplary embodiment, the desired temperature range is 15° Celsius-35° Celsius. In another exemplary embodiment, the threshold temperature level is 40° Celsius.

Referring to FIGS. 2, 3, 8 and 9, the cooling fin 70 includes a panel portion 130 and rail portions 132, 134. The panel portion 130 is rectangular-shaped and the rail portions 132, 134 are disposed on first and second ends, respectively of the panel portion 130. Further, a thickness of the rail portions 132, 134 are greater than a thickness of the panel portion 130. The cooling fin 70 can be constructed from at least one of copper and aluminum. Further, because the structure of the rail portions 132, 134 are substantially similar to one another, only the structure of rail portion 132 will be described in greater detail below. The rail portion 132 is constructed from folded portions 160, 162, 164, 166, 168, 170, 172, 174, 176 that are folded on top of one another. As shown, a first side of the panel portion 130 of the cooling fin 70 is disposed against the battery cell 60 to conduct heat energy from the battery cell 60 into the cooling fin 70. Further, a second side of the panel portion 130 is disposed against the battery cell 62 to conduct heat energy from the battery cell 62 into the cooling fin 70.

The cooling fin 72 includes a panel portion 180 and rail portions 181, 182. The panel portion 180 is rectangular-shaped and the rail portions 181, 182 are disposed on first and second ends, respectively of the panel portion 180. Further, a thickness of the rail portions 181, 182 are greater than a thickness of the panel portion 180. The cooling fin 72 can be constructed from any thermally conductive material such as a thermally conductive metal. For example, the cooling fin 72 can be constructed from at least one of copper and aluminum. Further, the structure of the rail portions 181, 182 are similar to the structure of the rail portion 132 discussed above. As shown, a first side of the panel portion 180 of the cooling fin 72 is disposed against the battery cell 62 to conduct heat energy from the battery cell 62 into the cooling fin 72. Further, a second side of the panel portion 180 is disposed against the battery cell 64 to conduct heat energy from the battery cell 64 into the cooling fin 72.

The cooling fin 74 includes a panel portion 185 and rail portions 186, 187. The panel portion 185 is rectangular-shaped and the rail portions 186, 187 are disposed on first and second ends, respectively of the panel portion 185. Further, a thickness of the rail portions 186, 187 are greater than a thickness of the panel portion 185. The cooling fin 74 can be constructed from any thermally conductive material such as a thermally conductive metal. For example, the cooling fin 74 can be constructed from at least one of copper and aluminum. Further, the structure of the rail portions 186, 187 are similar to the structure of the rail portion 132 discussed above. As shown, a first side of the panel portion 185 of the cooling fin 74 is disposed against the battery cell 64 to conduct heat energy from the battery cell 64 into the cooling fin 74.

Referring to FIGS. 1-7, the rail portions 134, 182, 187 have apertures 138, 140 extending therethrough. The conduits 80, 82 extend through the apertures 138, 140, respectively. Further, the rail portions 132, 181, 186 have apertures 142, 144 extending therethrough. The conduits 84, 86 extend through the apertures 142, 144, respectively. The conduits 80, 82, 84, 86 can be constructed from any thermally conductive material such as a thermally conductive metal. For example, the conduits 80, 82, 84, 86 can be constructed from at least one of copper and aluminum. The conduits 80, 82, 84, 86 are coupled at a first end to the conduit 28. Further, the conduits 80, 82, 84, 86 are coupled at a second end to the conduit 30. During operation, the rail portions of the cooling fins conduct heat energy into the conduits 80, 82, 84, 86. The conduits 80, 82, 84, 86 receive a refrigerant that flows therethrough and conducts heat energy from the conduits into the refrigerant. An advantage of the present battery module is that the rail portions have a greater thickness than the panel portions such that the rail portions allow a relatively large amount of heat energy to be conducted to the conduits and refrigerant, while maintaining a relatively thin profile of the battery module.

Referring again to FIG. 1, the compressor 22 is configured to pump a refrigerant through the conduit 28 into the battery module 20 in response to a control signal from the microprocessor 40. The conduit 28 is fluidly coupled to the compressor 22 and the conduits 80, 82, 84, 86 of the battery module 20. The conduit 30 is further fluidly coupled to the conduits 80, 82, 84, 86 of the battery module 20 and the condenser 24. After exiting the battery module 20, the refrigerant is pumped through the conduit 30 to the condenser 24.

The condenser 24 is provided to extract heat energy from the refrigerant flowing therethrough to cool the refrigerant. As shown, a conduit 32 is fluidly coupled between the condenser 24 and the compressor 22. After exiting the condenser 24, the refrigerant is further pumped through the conduit 32 to the compressor 22.

The temperature sensor 36 is provided to generate a signal indicative of a temperature level of the battery module 20 that is received by the microprocessor 40.

The fan 38 is provided to urge air past the condenser 24 to cool the condenser 24 in response to a control signal from the microprocessor 40. As shown, the fan 38 is disposed proximate to the condenser 24.

The microprocessor 40 is provided to control operation of the battery system 10. In particular, the microprocessor 40 is configured to generate control signals for controlling operation of the compressor 22 and the fan 38, in response to a signal from the temperature sensor 36, as will be explained in greater detail below.

Figure 10:
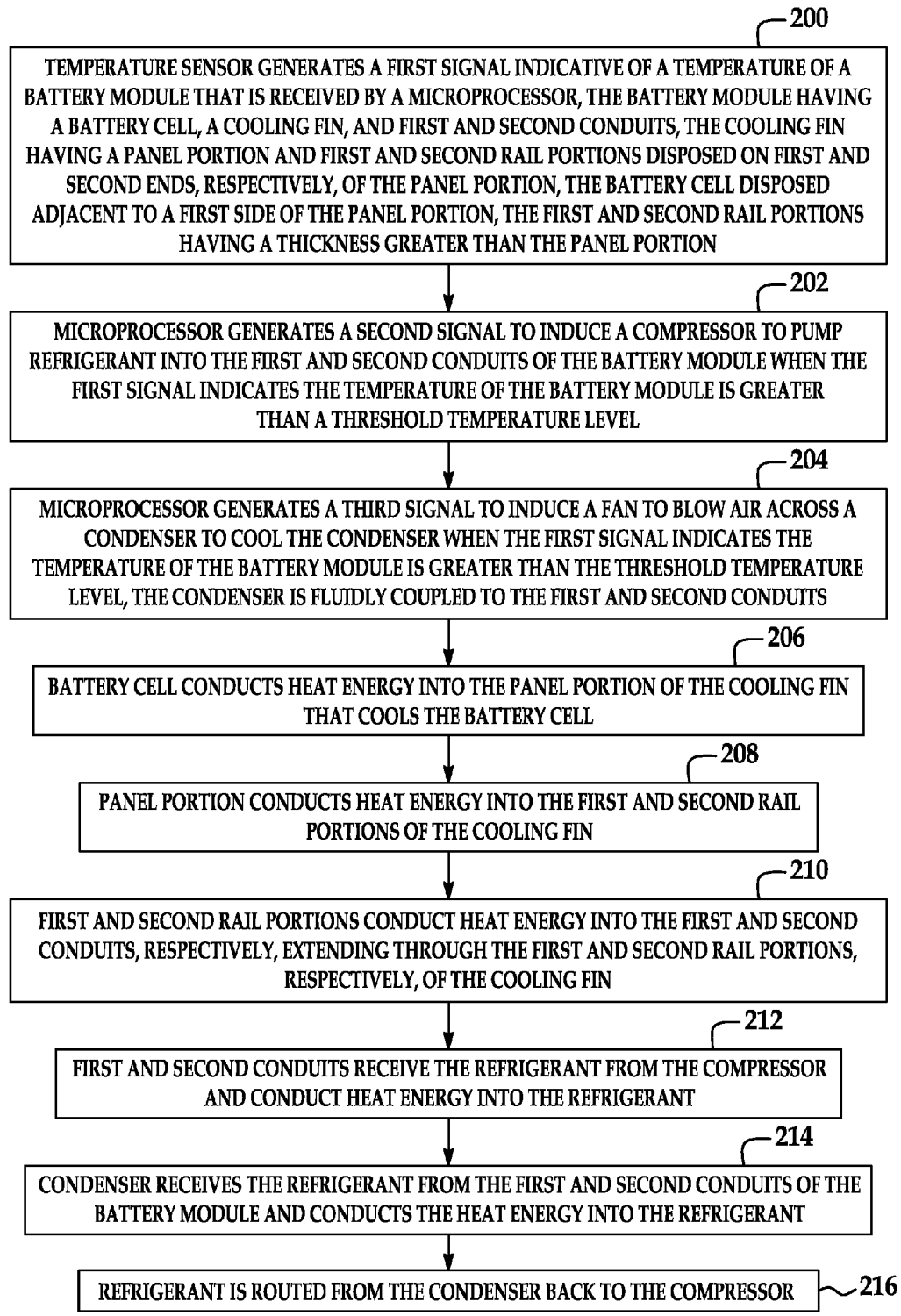
FIG. 10 is a flowchart of a method for cooling the battery module in the battery system of FIG. 1 in accordance with another exemplary embodiment.

Referring to FIG. 10, a flowchart of a method for cooling a battery module in accordance with an exemplary embodiment will now be explained. For purposes of simplicity, the method will be described utilizing a single battery cell, a single cooling fin and first and second conduits in a battery module. Of course, additional battery cells, cooling fins and conduits could be utilized.

At step 200, the temperature sensor 36 generates a first signal indicative of a temperature of the battery module 20 that is received by the microprocessor 40. The battery module 20 has the battery cell 60, the cooling fin 70, and conduits 80, 84. The cooling fin 70 has the panel portion 130 and rail portions 132, 134 disposed on first and second ends, respectively, of the panel portion 130. The battery cell 60 is disposed adjacent to a first side of the panel portion 130. The rail portions 132, 134 have a thickness greater than the panel portion 130.

At step 202, the microprocessor 40 generates a second signal to induce the compressor 22 to pump refrigerant into the conduits 80, 84 of the battery module 20 when the first signal indicates the temperature of the battery module 20 is greater than a threshold temperature level.

At step 204, the microprocessor 40 generates a third signal to induce the fan 38 to blow air across the condenser 24 to cool the condenser 24 when the first signal indicates the temperature of the battery module 20 is greater than the threshold temperature level. The condenser 24 is fluidly coupled to the conduits 80, 84 via the conduit 30.

At step 206, the battery cell 60 conducts heat energy into the panel portion 130 of the cooling fin 70 that cools the battery cell 60.

At step 208, the panel portion 130 conducts heat energy into the rail portions 132, 134 of the cooling fin 70.

At step 210, the rail portions 132, 134 conduct heat energy into the conduits 80, 84, respectively, extending through the rail portions 132, 134, respectively, of the cooling fin 70.

At step 212, conduits 80, 84 receive the refrigerant from the compressor 22 and conduct heat energy into the refrigerant.

At step 214, the condenser 24 receives the refrigerant from the conduits 80, 84 of the battery module 20 and conducts the heat energy into the refrigerant.

At step 216, the refrigerant is routed from the condenser 24 back to the compressor 22.

Figure 11:
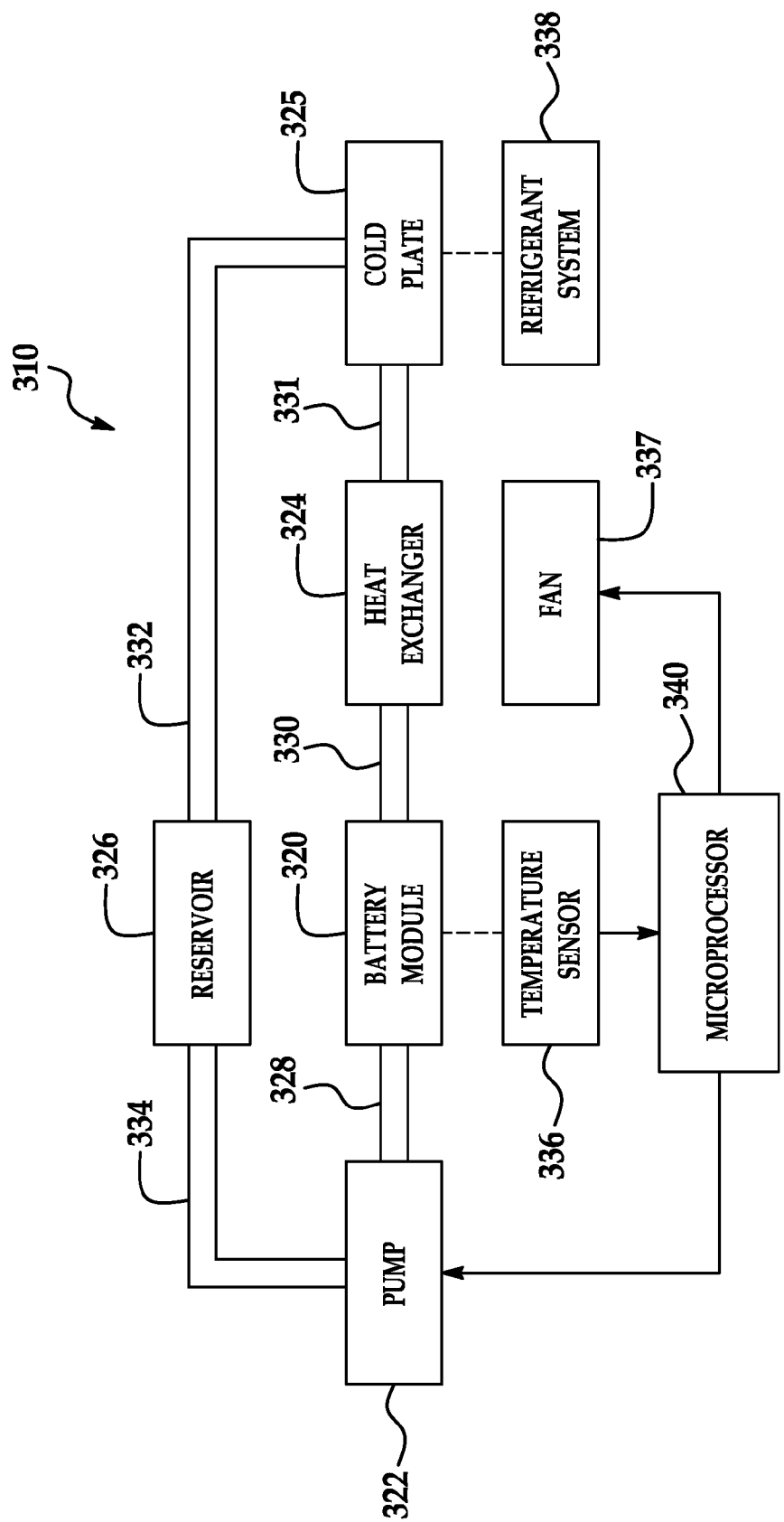
FIG. 11 is a schematic of a battery system in accordance with another exemplary embodiment.

Referring to FIG. 11, a battery system 310 for generating electrical power in accordance with another exemplary embodiment is illustrated. The battery system 310 includes a battery module 320, a pump 322, a heat exchanger 324, a cold plate 325, a reservoir 326, conduits 328, 330, 331, 332, 334, a temperature sensor 336, a fan 337, a refrigerant system 338, and a microprocessor 340. The primary difference between the battery system 310 and the battery system 10 is that the battery system 310 utilizes a coolant instead of a refrigerant to cool the battery module 320.

The battery module 320 has an identical structure as the battery module 20 discussed above.

The pump 322 is configured to pump a coolant through the conduit 328 into the battery module 320 in response to a control signal from the microprocessor 340. As shown, the conduit 328 is fluidly coupled between the pump 322 and the battery module 320, and the conduit 330 is fluidly coupled between the battery module 320 and the heat exchanger 324. After exiting the battery module 320, the coolant is further pumped through the conduit 330 to the heat exchanger 324.

The heat exchanger 324 is provided to extract heat energy from the coolant flowing therethrough to cool the coolant. As shown, a conduit 331 is fluidly coupled between the heat exchanger 324 and the cold plate 325. After exiting the heat exchanger 324, the coolant is further pumped through the conduit 331 to the cold plate 325.

The fan 337 is provided to urge air past the heat exchanger 324 to cool the heat exchanger 324 in response to a control signal from the microprocessor 340. As shown, the fan 337 is disposed proximate to the heat exchanger 324.

The cold plate 325 is provided to extract heat energy from the coolant flowing therethrough to further cool the coolant. As shown, a conduit 322 is fluidly coupled between the cold plate 325 and the reservoir 326. After exiting the cold plate 325, the coolant is further pumped through the conduit 332 to the reservoir 326.

The reservoir 326 is provided to store at least a portion of the coolant therein. As shown, a conduit 334 is fluidly coupled between the reservoir 326 and the pump 322. After exiting the reservoir 326, the coolant is further pumped through the conduit 334 to the pump 322.

The temperature sensor 336 is provided to generate a signal indicative of a temperature level of the battery module 320 that is received by the microprocessor 340.

The refrigerant system 338 is provided to cool the heat exchanger 324 in response to a control signal from the microprocessor 340. As shown, the refrigerant system 338 is operably coupled to the cold plate 325.

The microprocessor 340 is provided to control operation of the battery system 310. In particular, the microprocessor 340 is configured to generate control signals for controlling operation of the pump 322 and the refrigerant system 338, in response to a signal from the temperature sensor 336, as will be explained in greater detail below.

Figure 12:
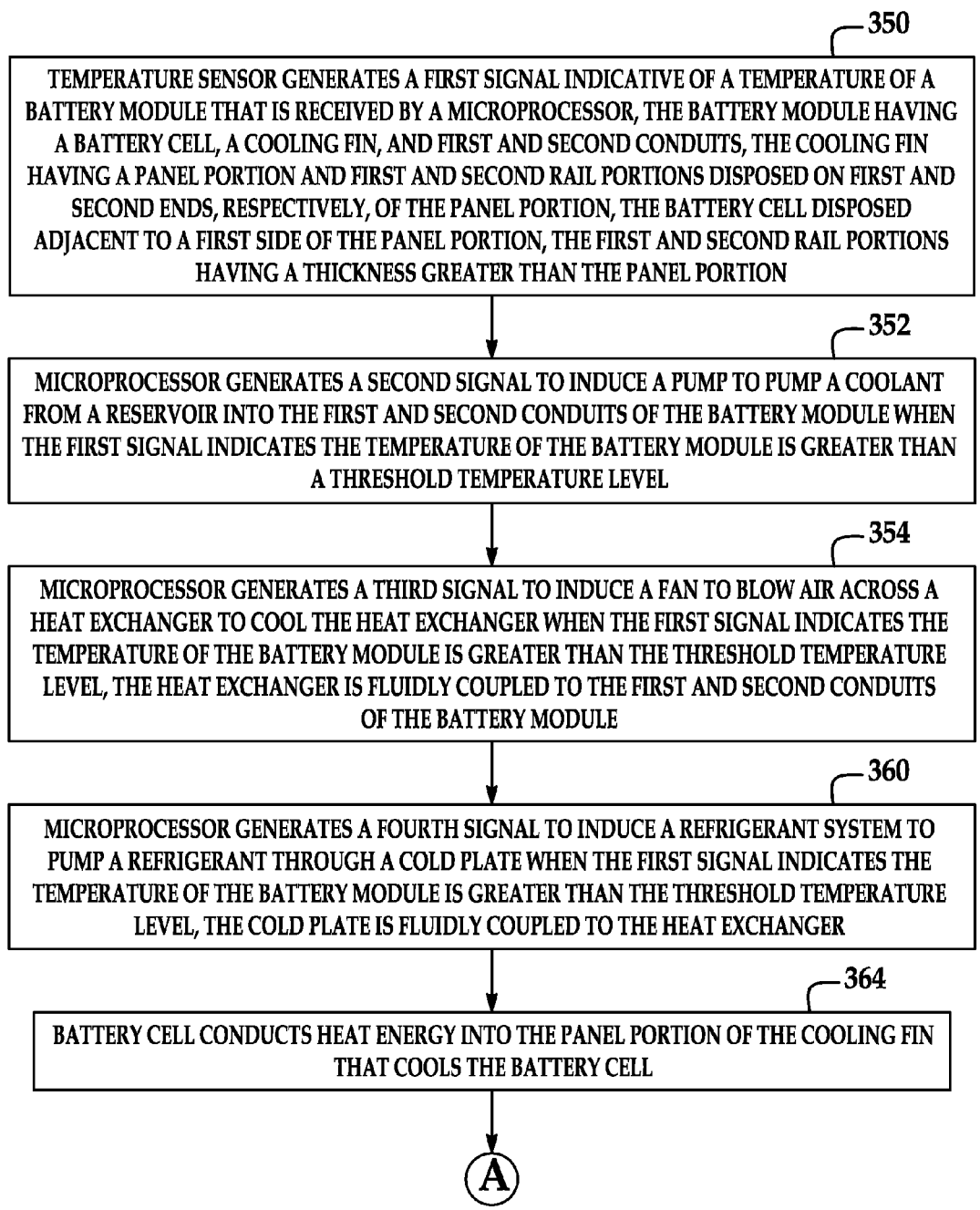
FIGS. 12-13 are flowcharts of a method for cooling the battery module in the battery system of FIG. 11 in accordance with another exemplary embodiment.
Figure 13:
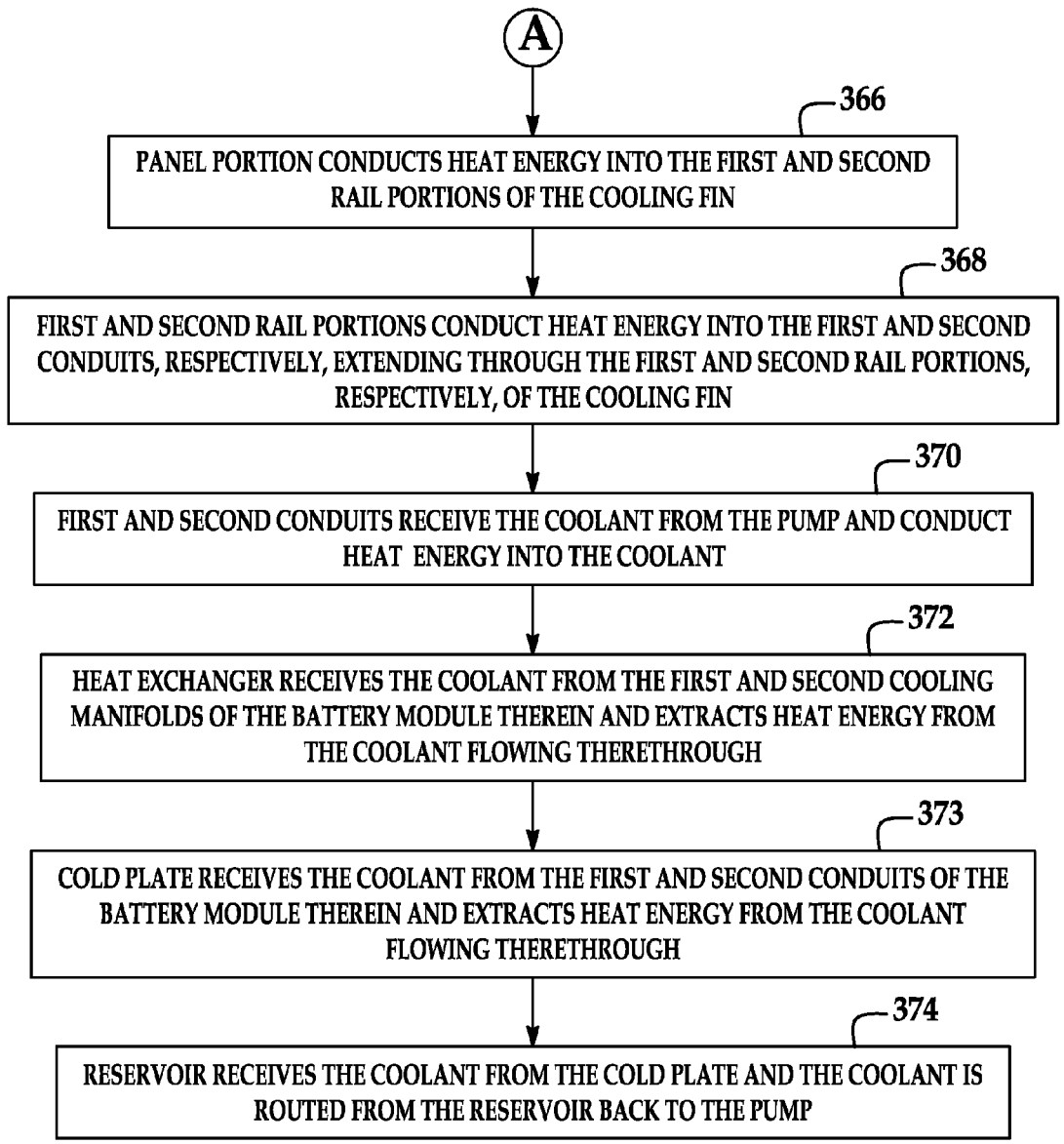
Figure 14:
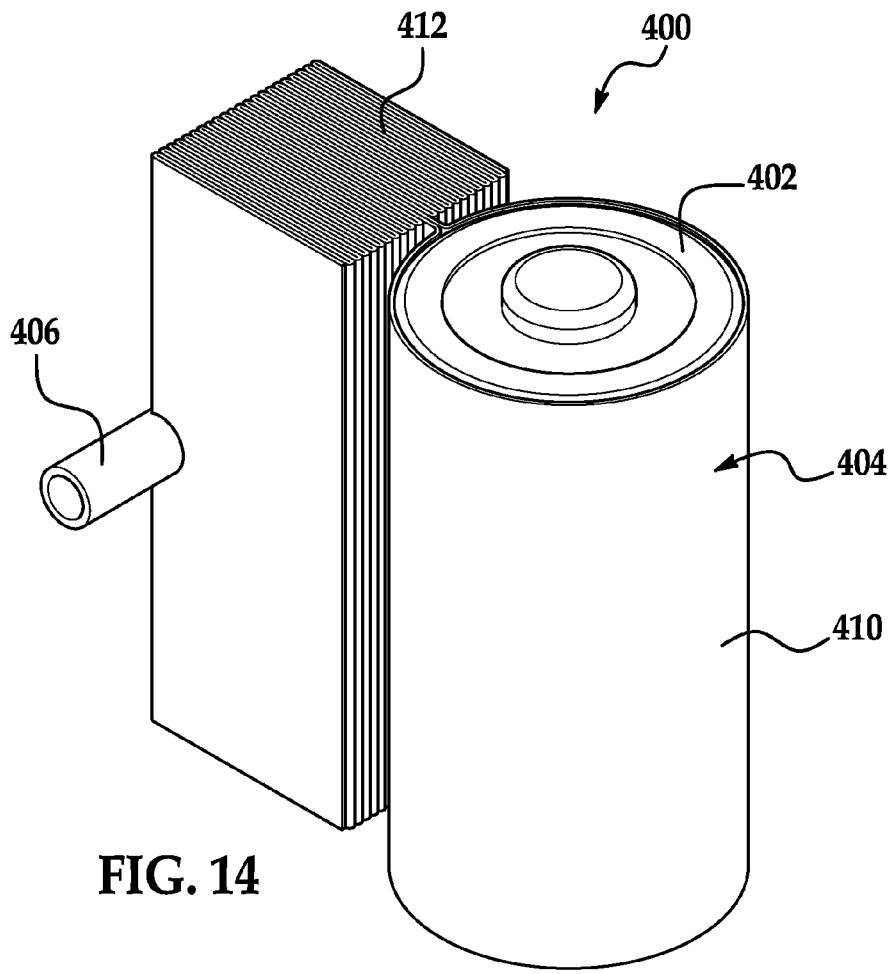
FIG. 14 is a schematic of another battery module in accordance with another exemplary embodiment.
Figure 15:
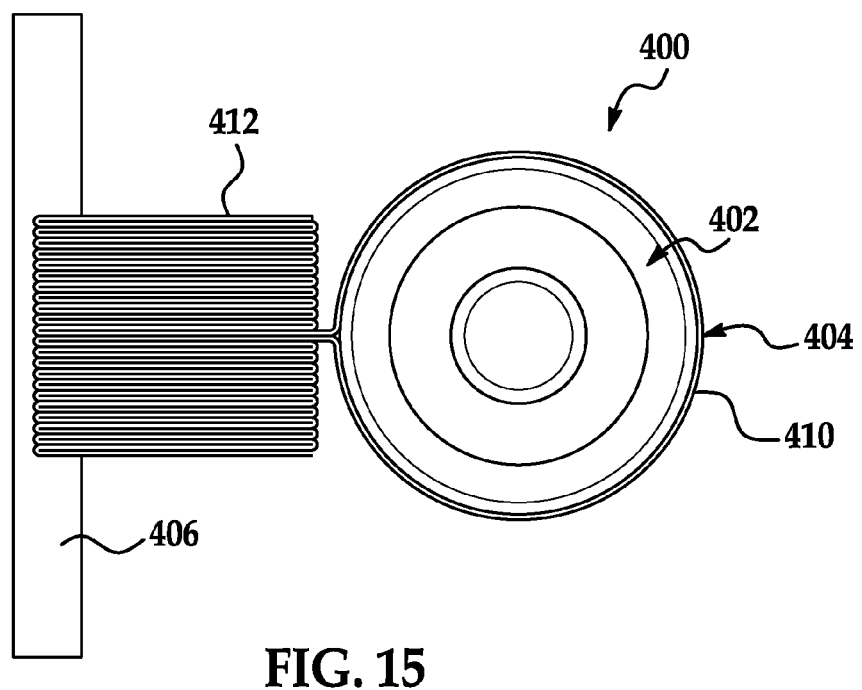
FIG. 15 is a schematic of a top view of the battery module of FIG. 14.
Figure 16:
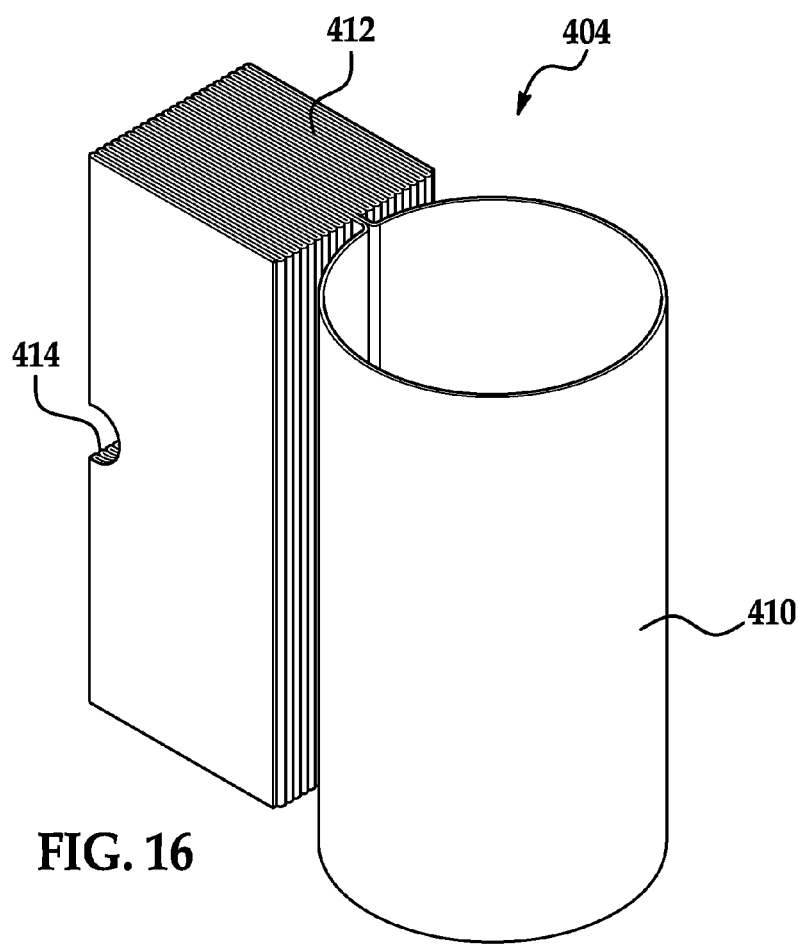
FIG. 16 is a schematic of a cooling fin utilized in the battery module of FIG. 14.
Figure 17:
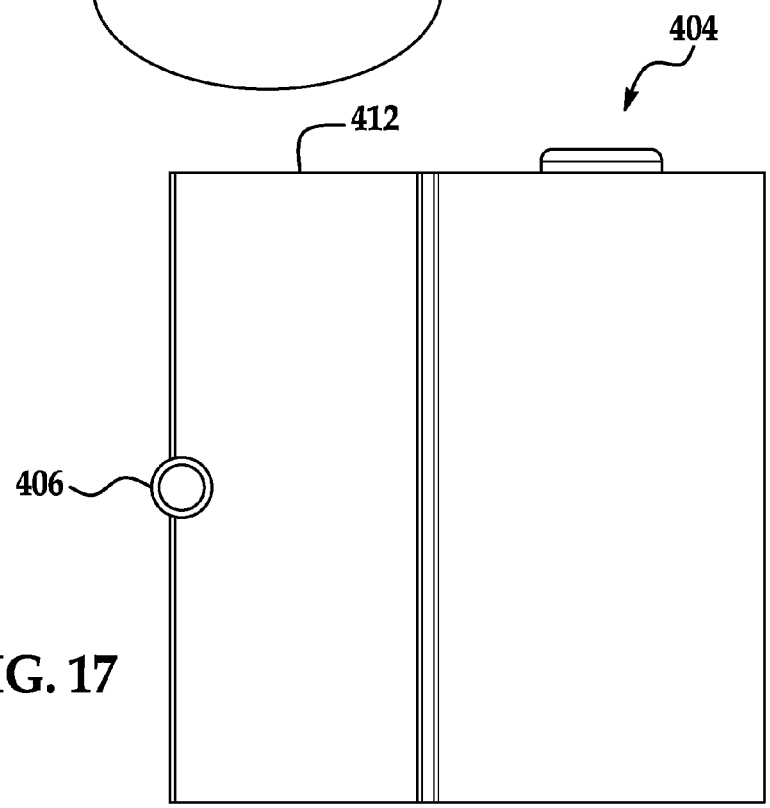
FIG. 17 is another schematic of the battery module of FIG. 14.

Referring to FIGS. 12-13, a flowchart of a method for cooling the battery module 320 in accordance with another exemplary embodiment is provided. For purposes of simplicity, the method will be described utilizing a single battery cell, a single cooling fin and first and second conduits in a battery module. Of course, additional battery cells, cooling fins and conduits could be utilized. In one exemplary embodiment, the battery module 320 has an identical structure as the battery module 20.

At step 350, the temperature sensor 336 generates a first signal indicative of a temperature of the battery module 320 that is received by the microprocessor 340. The battery module 320 has a battery cell, a cooling fin, and first and second conduits. The cooling fin has a panel portion and first and second rail portions disposed on first and second ends, respectively, of the panel portion. The battery cell is disposed adjacent to a first side of the panel portion. The first and second rail portions have a thickness greater than the panel portion.

At step 352, the microprocessor 340 generates a second signal to induce the pump 322 to pump a coolant from the reservoir 326 into the first and second conduits of the battery module 320 when the first signal indicates the temperature of the battery module 320 is greater than a threshold temperature level.

At step 354, the microprocessor 340 generates a third signal to induce the fan 337 to blow air across the heat exchanger 324 to cool the heat exchanger 324 when the first signal indicates the temperature of the battery module 320 is greater than the threshold temperature level. The heat exchanger 324 is fluidly coupled to the first and second conduits of the battery module 324.

At step 360, the microprocessor 340 generates a fourth signal to induce the refrigerant system 338 to pump a refrigerant through the cold plate 325 to cool the cold plate 325 when the first signal indicates the temperature of the battery module 320 is greater than the threshold temperature level. The cold plate 325 is fluidly coupled to the heat exchanger 324.

At step 364, the battery cell conducts heat energy into the panel portion of the cooling fin that cools the battery cell.

At step 366, the panel portion conducts heat energy into the first and second rail portions of the cooling fin.

At step 368, the first and second rail portions conduct heat energy into the first and second conduits, respectively, extending through the first and second rail portions, respectively, of the cooling fin.

At step 370, the first and second conduits receive the coolant from the pump 322 and conduct heat energy into the coolant.

At step 372, the heat exchanger 324 receives the coolant from the first and second cooling manifolds of the battery module 320 therein and extracts heat energy from the coolant flowing therethrough.

At step 373, the cold plate 325 receives the coolant from the first and second conduits of the battery module 320 therein and extracts heat energy from the coolant flowing therethrough.

At step 374, the reservoir 326 receives the coolant from the cold plate 325 and routes the coolant from the reservoir 326 back to the pump 322.

Referring to FIGS. 14-17, the battery module 400 is provided to generate a voltage therein in accordance with another exemplary embodiment. The battery module 400 includes a cylindrical battery cell 402, a cooling fin 404, and a conduit 406. It should be noted that the battery module 400 can be utilized in the system 10 by replacing the battery module 20 therein with the battery module 400. Further, the battery module 400 can be utilized in the system 310 by replacing the battery module 320 therein with the battery module 400.

The battery cell 402 is provided to generate an operational voltage. The battery cell 402 is generally cylindrically-shaped. In an exemplary embodiment, the battery cell 402 includes first and second electrodes disposed at opposite ends of the battery cell 402 that have an operational voltage generated therebetween.

The cooling fin 404 is provided to conduct heat energy from the battery cell 402 to cool the battery cell 402. In particular, the cooling fin 404 can maintain the battery cell within a desired temperature range, and in particular can maintain the battery cell at a temperature less than a threshold temperature level.

The cooling fin 404 includes a tubular portion 410 and a laminated box-shaped portion 412. The tubular portion 410 is configured to surround a periphery of the battery cell 402. The laminated box-shaped portion 412 is coupled to the tubular portion 410 and is constructed from a plurality of generally rectangular-shaped layers. The portion 412 has an aperture 414 extending therethrough. The cooling fin 404 can be constructed from at least one of copper and aluminum. The tubular portion 410 conducts heat energy from the battery cell 402 into the portion 412 of the cooling fin 404 to cool the battery cell 402.

The conduit 406 is disposed within the aperture 414 in the portion 412. During operation, the portion 412 conducts heat energy into the conduit 406. The conduit 406 receives a fluid that flows therethrough and conducts heat energy from the conduit 406 into the fluid.

The battery systems, battery modules, and the method for cooling the battery module provide a substantial advantage over other systems, modules, and methods. In particular, the battery systems, battery modules and method provide a technical effect of cooling a battery cell in the battery module utilizing rail portions have a greater thickness than the panel portions that allow a relatively large amount of heat energy to be conducted to the conduits and fluid, while maintaining a relatively thin profile of the battery module.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A battery module, comprising:
   a first battery cell;
   a first cooling fin having a first panel portion and first and second rail portions disposed on a first side of the first panel portion, the first battery cell being disposed adjacent to a first side of the first panel portion between the first and second rail portions, the first and second rail portions each having a thickness greater than the first panel portion;
   the first rail portion having at least first and second folded portions that are folded on top of one another, the first folded portion being disposed on the first side of the first panel portion, the second folded portion being disposed on the first folded portion;
   the second rail portion having a plurality of folded portions that are folded on top of one another,
   the first cooling fin conducting heat energy from the first battery cell into the first cooling fin to cool the first battery cell; and
   first and second conduits extending through the first and second rail portions, respectively, of the first cooling fin that receive a fluid that flows through the first and second conduits to conduct heat energy from the first cooling fin into the fluid, the first conduit extending through both the first rail portion and the first panel portion.

2. The battery module of claim 1, further comprising a second battery cell disposed adjacent a second side of the first panel portion, the second side being opposite to the first side.

3. The battery module of claim 1, further comprising a second cooling fin having a second panel portion and third and fourth rail portions disposed on first and second ends, respectively, of the second panel portion, the second battery cell being disposed adjacent to a first side of the second panel portion, the third and fourth rail portions having a thickness greater than the second panel portion, the second cooling fin conducting heat energy from the second battery cell to the second cooling fin to cool the second battery cell.

4. The battery module of claim 1, wherein the first cooling fin is constructed from a thermally conductive material.

5. The battery module of claim 1, wherein the first and second conduits are constructed from a thermally conductive material.

6. The battery module of claim 1, wherein the first panel portion is rectangular shaped.

7. A battery system, comprising:
   a battery module having a first battery cell, a first cooling fin, and first and second conduits, the first cooling fin having a first panel portion and first and second rail portions disposed on a first side of the first panel portion between the first and second rail portions, the first battery cell being disposed adjacent to a first side of the first panel portion, the first and second rail portions each having a thickness greater than the first panel portion;
   the first rail portion having at least first and second folded portions that are folded on top of one another, the first folded portion being disposed on the first side of the first panel portion, the second folded portion being disposed on the first folded portion;
   the second rail portion having a plurality of folded portions that are folded on top of one another;
   the first cooling fin conducting heat energy from the first battery cell into the first cooling fin to cool the first battery cell, the first and second conduits extending through the first and second rail portions, respectively, of the first cooling fin and receiving a refrigerant that flows through the first and second conduits to conduct heat energy from the first cooling fin into the refrigerant, the first conduit extending through both the first rail portion and the first panel portion;
   a condenser fluidly coupled to the first and second conduits of the battery module, the condenser configured to receive the refrigerant from the first and second conduits of the battery module and to extract heat energy from the refrigerant; and
   a compressor fluidly coupled to the condenser and configured to receive the refrigerant from the condenser, the compressor further fluidly coupled to the first and second conduits of the battery module, the compressor configured to pump the refrigerant from the condenser into the first and second conduits.

8. The battery system of claim 7, further comprising:
   a temperature sensor configured to generate a first signal indicative of a temperature of the battery module; and
   a microprocessor operably coupled to the temperature sensor, the microprocessor configured to generate a second signal to induce the compressor to pump the refrigerant from the condenser into the first and second conduits of the battery module when the first signal indicates the temperature of the battery module is greater than a threshold temperature level.

9. A battery system, comprising:
   a battery module having a first battery cell, a first cooling fin, and first and second conduits, the first cooling fin having a first panel portion and first and second rail portions disposed on a first side of the first panel portion, the first battery cell being disposed adjacent to a first side of the first panel portion between the first and second rail portions, the first and second rail portions each having a thickness greater than the first panel portion;
   the first rail portion having at least first and second folded portions that are folded on top of one another, the first folded portion being disposed on the first side of the first panel portion, the second folded portion being disposed on the first folded portion;
   the second rail portion having a plurality of folded portions that are folded on top of one another,
   the first cooling fin conducting heat energy from the first battery cell to the first cooling fin to cool the first battery cell, the first and second conduits extending through the first and second rail portions, respectively, of the first cooling fin and receiving a coolant that flows through the first and second conduits to conduct heat energy from the first cooling fin into the coolant, the first conduit extending through both the first rail portion and the first panel portion;
   a heat exchanger fluidly coupled to the battery module, the heat exchanger configured to receive the coolant from the battery module therein and to extract heat energy from the coolant flowing therethrough;

a cold plate fluidly coupled to the heat exchanger, the cold plate configured to extract heat energy from the coolant flowing therethrough;

a reservoir fluidly coupled between the cold plate and a pump, the reservoir configured to receive the coolant from the cold plate and to route the coolant to the pump; and the pump further fluidly coupled to the first and second conduits of the battery module, the pump configured to pump the coolant from the reservoir into the first and second conduits.

10. A battery module, comprising:

a cylindrical battery cell;

a cooling fin having a tubular portion and a laminated box-shaped portion coupled to the tubular portion, the laminated box-shaped portion having a plurality of rectangular-shaped layers, the tubular portion configured to surround a portion of the cylindrical battery cell, the cooling fin conducting heat energy from the battery cell to the cooling fin to cool the battery cell; and a conduit extending through the laminated box-shaped portion of the cooling fin that receives a fluid that flows through the conduit to conduct heat energy from the cooling fin into the fluid.

11. The battery module of claim 10, wherein the cooling fin is constructed from a thermally conductive material.

12. The battery module of claim 10, wherein the conduit is constructed from a thermally conductive material.

13. The battery module of claim 1, wherein each folded portion of the first plurality of folded portions has a thickness substantially equal to a thickness of the first panel portion.

14. A battery module, comprising:

a first battery cell;

a first cooling fin having a first panel portion and first and second rail portions disposed on first and second ends, respectively, of the first panel portion, the first battery cell being disposed adjacent to a first side of the first panel portion, the first and second rail portions each having a thickness greater than the first panel portion, the thickness of each of the first and second rail portions being substantially equal to a thickness of the first battery cell, the first cooling fin conducting heat energy from the first battery cell into the first cooling fin to cool the first battery cell; and first and second conduits extending through the first and second rail portions, respectively, of the first cooling fin, the first and second conduits further extending through the first panel portion; the first and second conduits receiving a fluid that flows through the first and second conduits to conduct heat energy from the first cooling fin and the first panel portion into the fluid.

15. The battery module of claim 1, wherein the thickness of each of the first and second rail portions being substantially equal to a thickness of the first battery cell.

16. The battery system of claim 7, wherein the thickness of each of the first and second rail portions being substantially equal to a thickness of the first battery cell.

17. The battery system of claim 9, wherein the thickness of each of the first and second rail portions being substantially equal to a thickness of the first battery cell.

* * * * *